Dec. 29, 1959  I. V. HAMRICK  2,918,746
AUTOMATIC FISHING DEVICE
Filed Nov. 21, 1958
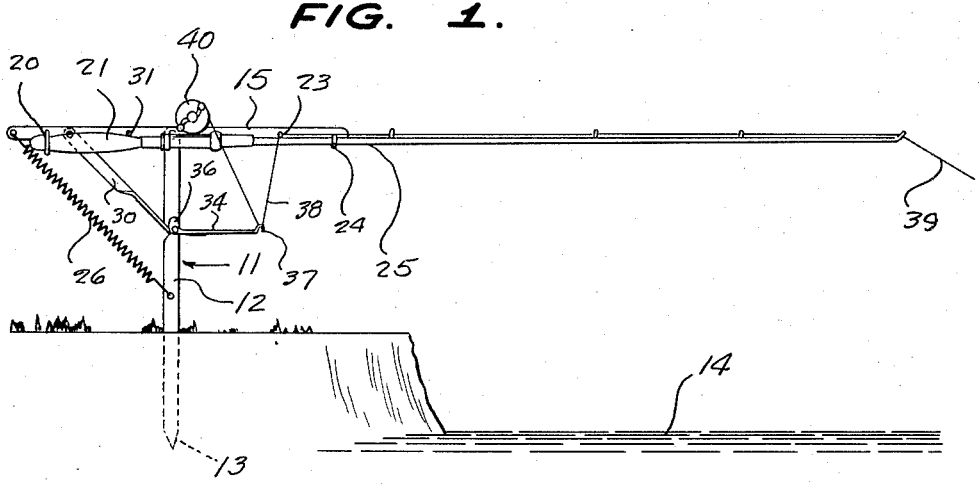
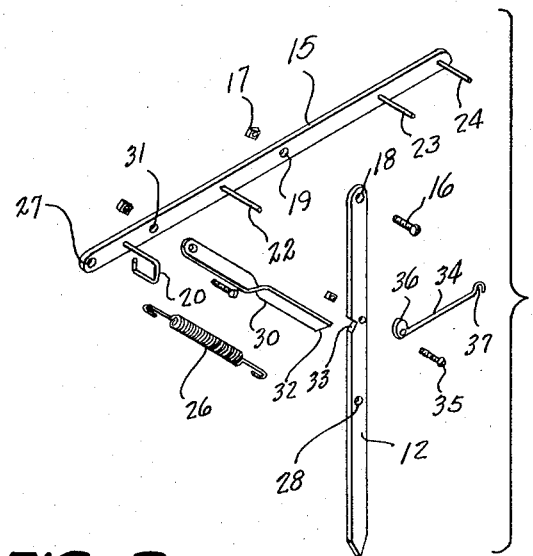
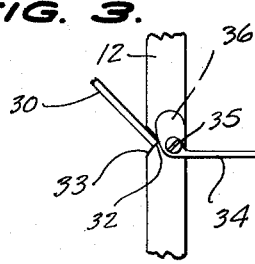
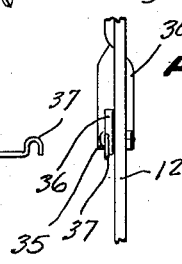
INVENTOR.
ITHIEL V. HAMRICK
BY
McMorrow, Berman & Davidson
ATTORNEYS

United States Patent Office 2,918,746
Patented Dec. 29, 1959

2,918,746

AUTOMATIC FISHING DEVICE

Ithiel V. Hamrick, Stanley, N.C.

Application November 21, 1958, Serial No. 775,597

3 Claims. (Cl. 43—15)

This invention relates to apparatus for catching fish, and more particularly to a device adapted to support a fishing rod and to automatically elevate the forward end of a fishing rod in response to a pull applied to the fishing line associated with the rod, whereby to catch a fish nibbling at the line.

The main object of the invention is to provide a novel and improved automatic fishing device which is simple in construction, which is easy to set up for use, and which eliminates the necessity of the fisherman holding the fishing rod for long periods of time while waiting for a fish to nibble on the line.

A further object of the invention is to provide an improved automatic fishing device which is inexpensive to manufacture, which is durable in construction, which involves only a few parts, and which may be readily installed on the bank of a stream or other body of water in a position to hold a fishing rod over said body of water.

Further objects and advantages of the invention will become apparent from the following description and claims, and from the accompanying drawings, wherein:

Figure 1 is a side elevational view of an improved automatic fishing device constructed in accordance with the present invention and shown set up for use.

Figure 2 is a perspective view showing the components of the automatic fishing device employed in Figure 1, said components being illustrated in separated positions.

Figure 3 is an enlarged elevational detail view showing the manner in which the locking lever of the automatic fishing device is lockingly engaged with the vertical support member of the device to oppose the spring biasing means thereof and in a position to be released responsive to an upward jerk on the fishing line associated with the fishing rod supported on the device.

Figure 4 is a front elevational view of the structure illustrated in Figure 3.

Referring to the drawings, 11 generally designates an automatic fishing device according to the present invention. The fishing device comprises a vertical supporting stake 12 having a pointed lower end 13 so that the vertical stake 12 may be embedded in the ground in the manner illustrated in Figure 1 adjacent to a body of water 14. Designated at 15 is an arm pivoted at its intermediate portion to the top end of the vertical supporting member 12, for example, by means of a pivot screw 16 and a nut 17, the pivot screw extending through respective apertures 18 and 19 provided in the top end of the vertical supporting member 12 and the arm 15.

Secured to one end portion of arm 15 and projecting perpendicularly therefrom is a loop member 20 adapted to receive the handle portion 21 of a fishing rod, the arm 15 being further provided with outwardly extending pin members 22, 23 and 24, spaced along the arm 15, said pin members being adapted to support the remaining portion of the fishing rod, shown at 25, in a position disposed parallel and adjacent to the arm 15.

Designated at 26 is a coiled spring connected at one end to the end portion of arm 15, as by being fastened to the arm at an aperture 27 provided thereon, and being connected at its opposite end to the lower portion of the vertical supporting member 12, as by being engaged with an aperture 28 formed in the lower portion of member 12. Thus, the spring 26 is connected between the end of arm 15 and the vertical supporting member 12 in a manner to bias the opposite end of arm 15 upwardly, namely, to bias the forward end of the fishing rod 25 supported on the arm 15 in an upward direction.

Designated at 30 is a locking lever which is pivotally connected at one end to the arm 15 at an aperture 31 formed in said arm inwardly adjacent to the spring-connecting aperture 27. The locking lever 30 is formed at its other end with a transversely extending edge 32, adapted to serve as a detent means, which is lockingly receivable in a notch 33 formed in the upper portion of the edge of the vertical supporting member 12, the lever 30 being of sufficient length so that the arm 15 will be held in a substantially horizontal position against the biasing force of spring 26 when edge 32 engages the notch 33.

Designated at 34 is a release member of a rod which is pivoted adjacent one end as at 35 to the vertical supporting member 12, the pivotal connection 35 being located adjacent the notch 33, as is clearly shown in Figure 3. Rod 34 is formed on said one end with a means or cam-like abutment member 36 which extends upwardly and which is disposed adjacent to the transverse edge 32 of release lever 30 in the cocked position of the device, as shown in Figure 3, and which acts to push edge 32 out of notch 33 responsive to counterclockwise rotation of the release rod 34, as viewed in Figure 3.

The release rod 34 is formed at its other end with a downwardly facing generally U-shaped loop 37 adapted to be engaged with a downwardly looped portion 38 of the fishing line 39, as illustrated in Figure 1, whereby a jerk on the fishing line 39 will be transmitted to the release rod 34 by loop 38 and will rotate rod 34 upwardly. This causes the cam-like abutment member 36 to rotate to the left, as viewed in Figure 3, and to push the transverse edge 32 of locking lever 30 out of the notch 33. When this occurs, the coiled spring 26 is released to exert its biasing force on the arm 15, whereby the forward end of the arm is rapidly elevated, and whereby the fishing rod exerts a pull on the line 39, thus catching the fish.

As shown in Figure 1, the loop 20 may be employed to receive the tapered outer end portion of the handle 21 of the fishing rod, the inner end portion of the handle 21 being received beneath the horizontally extending pin member 22. The shank of the rod may then be received beneath the outwardly extending pin member 23 and above the outwardly extending end pin member 24, thus supporting the rod and holding same parallel and adjacent to the arm 15. The fishing line may be engaged over the outwardly extending pin element 23, as shown in Figure 1, and looped downwardly to define the loop 38 which is received in the downwardly facing loop element 37 of the release rod 34. Thus, the loop 38 is formed between the reel 40 of the rod and the outwardly projecting pin element 23 overlying the shank of the fishing rod.

While a specific embodiment of an automatic fishing device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An automatic fishing device comprising a support, an arm pivoted to the top portion of said support, means on said arm to supportingly receive a fishing rod, spring means biasing one end of said arm upwardly, a locking lever having one end pivoted to said arm, detent means on the other end of said lever, means on said support adapted to be engaged with said detent means on said arm to oppose said spring means, a release member pivoted adjacent one end thereof to said support and provided on said one end with means engageable with said lever to disengage the lever from said support responsive to upward movement of said release member, and means on the other end of said release member engageable by a portion of a fishing line, whereby upward movement of said fishing line portion moves the release member upwardly to cause release of said locking lever.

2. An automatic fishing device comprising a support, an arm pivoted to the top portion of said support, means on said arm to supportingly receive a fishing rod, spring means connecting said arm to said support and biasing one end of said arm upwardly, a locking lever having one end pivoted to said arm adjacent said spring means, detent means on the other end of said lever, means on said support adapted to be engaged with said detent means on said arm to oppose said spring means, a release member pivoted adjacent one end thereof to said support, abutment means on said one end of said release member engageable with said lever to disengage the lever from said support responsive to upward movement of said release member, and means on the other end of said release member engageable by a portion of a fishing line in a manner whereby upward movement of said fishing line portion moves the release member upwardly to cause release of said locking lever.

3. An automatic fishing device comprising a support, an arm pivoted to the top portion of said support, means on said arm to supportingly receive a fishing rod, spring means connecting said arm to said support and biasing one end of said arm upwardly, a locking lever pivoted to said arm adjacent said spring means, detent means on the lever lockingly engageable with said support to oppose said spring means, a release rod pivoted to said support, a cam element on said release rod engageable with said lever to disengage the lever from said support responsive to upward movement of said release rod, and a loop element on the free end of the release rod engageable by a portion of a fishing line in a manner whereby upward movement of said fishing line portion moves the release rod upwardly to cause release of said locking lever.

References Cited in the file of this patent

UNITED STATES PATENTS

| | | |
|---|---|---|
| 2,564,840 | Glenn | Aug. 21, 1951 |
| 2,642,690 | Soenksen | June 23, 1953 |